United States Patent
Winter

(10) Patent No.: US 11,390,036 B2
(45) Date of Patent: Jul. 19, 2022

(54) METHOD OF ALIGNING PIXELATED LIGHT ENGINES

(71) Applicant: 3D Systems, Inc., Rock Hill, SC (US)

(72) Inventor: Kirt Winter, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 213 days.

(21) Appl. No.: 16/842,818

(22) Filed: Apr. 8, 2020

(65) Prior Publication Data

US 2020/0346412 A1 Nov. 5, 2020

Related U.S. Application Data

(60) Provisional application No. 62/842,565, filed on May 3, 2019.

(51) Int. Cl.
| | |
|---|---|
| *B29C 64/393* | (2017.01) |
| *B33Y 10/00* | (2015.01) |
| *B33Y 30/00* | (2015.01) |
| *B29C 64/264* | (2017.01) |
| *B29C 64/129* | (2017.01) |
| *B29C 64/245* | (2017.01) |
| *B33Y 50/02* | (2015.01) |
| *B29C 64/277* | (2017.01) |
| *B29C 64/135* | (2017.01) |

(52) U.S. Cl.
CPC .......... *B29C 64/393* (2017.08); *B29C 64/129* (2017.08); *B29C 64/245* (2017.08); *B29C 64/264* (2017.08); *B33Y 10/00* (2014.12); *B33Y 30/00* (2014.12); *B33Y 50/02* (2014.12); *B29C 64/135* (2017.08); *B29C 64/277* (2017.08)

(58) Field of Classification Search
CPC ... B29C 64/393; B29C 64/264; B29C 64/245; B29C 64/129; B29C 64/277; B29C 64/135; B33Y 10/00; B33Y 30/00; B33Y 50/02
USPC .......................................... 264/40.1; 425/375
See application file for complete search history.

(56) References Cited

U.S. PATENT DOCUMENTS

| | | | |
|---|---|---|---|
| 8,666,142 B2 | 3/2014 | Shkolnik et al. | |
| 9,993,976 B2 | 6/2018 | Coeck et al. | |
| 2018/0056585 A1 | 3/2018 | Du Toit | |
| 2019/0091934 A1* | 3/2019 | Cooper | G06T 7/30 |

\* cited by examiner

*Primary Examiner* — Joseph S Del Sole
*Assistant Examiner* — Lawrence D. Hohenbrink, Jr.

(57) ABSTRACT

A three-dimensional printing system is for fabricating or manufacturing a three-dimensional article. The three-dimensional printing system includes a substrate, a light engine, a radiation sensor, and a controller. The substrate has a surface positioned proximate to a build field. The surface supports a calibration target which includes or defines elongate light modulating bars disposed at two different orientations and including a Y-bar aligned with a Y-axis and an X-bar aligned with an X-axis. The light engine includes a plurality of projection modules including at least a first projection module and a second projection module. The first projection module configured to project an array of pixels onto a first image field. The second projection module configured to project an array of pixels onto a second image field.

19 Claims, 7 Drawing Sheets

US 11,390,036 B2

METHOD OF ALIGNING PIXELATED LIGHT ENGINES

CROSS-REFERENCE TO RELATED APPLICATIONS

This non-provisional patent application claims priority to U.S. Provisional Application Ser. No. 62/842,565, Entitled "Method of Aligning Pixelated Light Engines" by Kirt Winter, filed on May 3, 2019, incorporated herein by reference under the benefit of U.S.C. 119(e).

FIELD OF THE INVENTION

The present disclosure concerns an apparatus and method for the digital fabrication of three dimensional articles of manufacture through the solidification of liquid photon-curable (photocure) resins using plural light engines. More particularly, the present disclosure concerns an accurate and efficient method of aligning plural light engines to provide large, high quality articles of manufacture.

BACKGROUND

Three dimensional (3D) printers are in rapidly increasing use. One class of 3D printers includes stereolithography printers having a general principle of operation including the selective curing and hardening of radiation curable (photo-curable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin onto a "support fixture." Each selectively cured layer is formed at a "build plane" or "build field" within the resin.

One class of stereolithography systems utilizes light engines based on spatial light modulators such as arrays of micromirrors. Such systems are generally limited by the pixel count of the spatial light modulator. There is a desire to provide systems having larger numbers of pixels to form larger and higher resolution articles of manufacture.

SUMMARY

Figure 1:
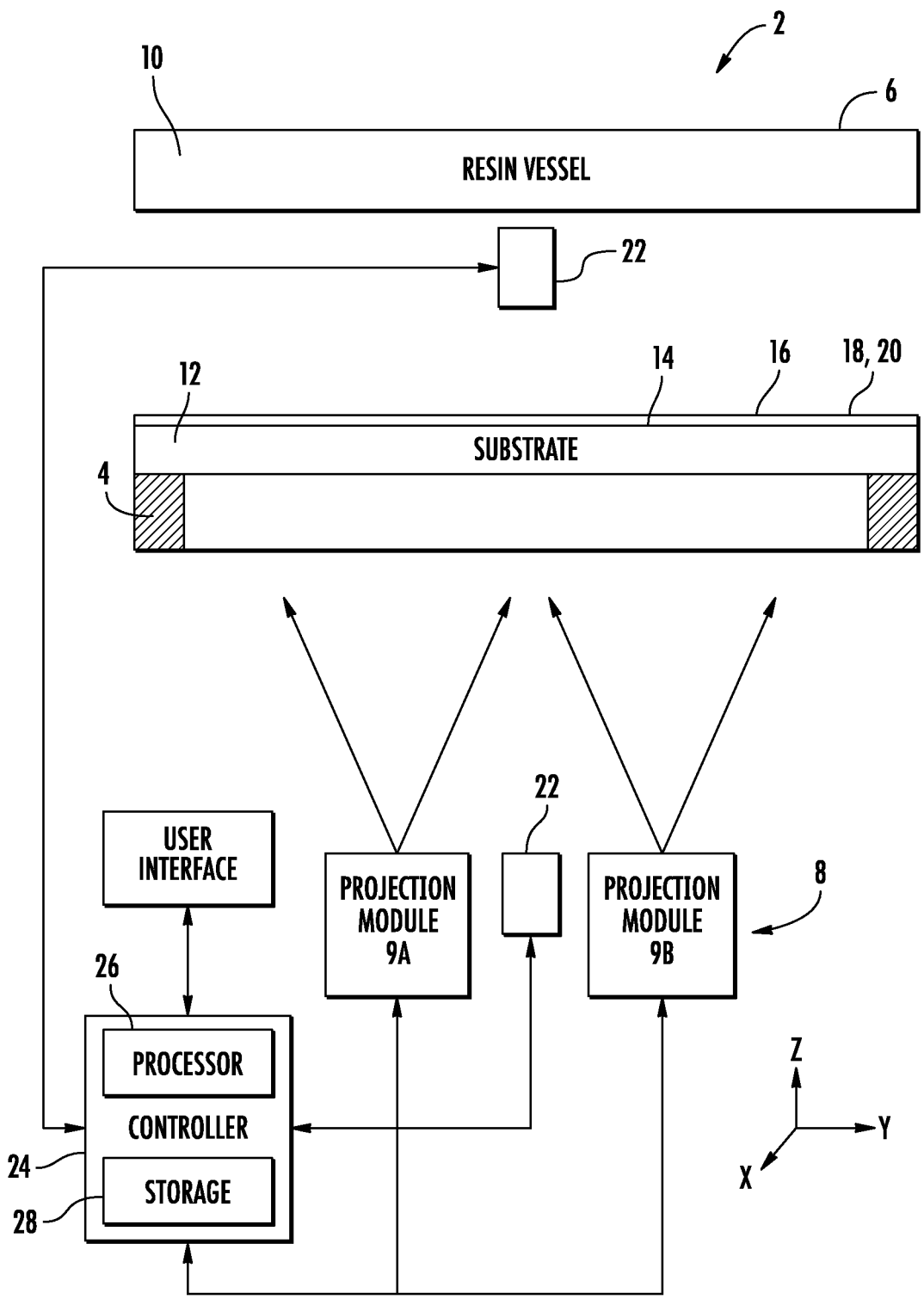
FIG. 1 is a schematic diagram of an embodiment of a three-dimensional printing system for manufacturing or fabricating a three-dimensional article.

In a first aspect of the disclosure, a three-dimensional printing system is for fabricating or manufacturing a three-dimensional article. The three-dimensional printing system includes a substrate, a light engine, a radiation sensor, and a controller. The substrate has a surface positioned proximate to a build field. The build field is for hardening layers of a build material during fabrication of the three-dimensional article. The surface supports a calibration target which includes or defines elongate light modulating bars disposed at two different orientations and including a Y-bar aligned with a Y-axis and an X-bar aligned with an X-axis. The light engine includes a plurality of projection modules including at least a first projection module and a second projection module. The first projection module is configured to project an array of pixels onto a first image field. The second projection module is configured to project an array of pixels onto a second image field. The image fields of the light engine cover the build field including at least one overlap field between the first image field and the second image field. The radiation sensor receives light from the calibration target that is reflected, emitted, or transmitted. The controller is configured to: (1) operate the first projection module to project a first sequence of columns of pixels onto the target; the columns are individually approximately angularly aligned with the Y-axis; the first temporal sequence of columns are separated from each other along the X-axis; (2) operate the radiation sensor to measure an intensity of light from the target during the first sequence; (3) store first information indicative of the measured intensity versus column axial position; (4) analyze the stored first information to align the first projection module to the calibration target along the X-axis. The projected columns of light are spatially and temporally separated from each other so that the radiation sensor receives light originating from one projected column at a time. The target can be either a light field or dark field target. The system can further include a resin vessel for containing photocurable resin to be selectively cured by the light engine and a support plate for alternately supporting the resin vessel and the substrate.

In one implementation the stored information defines an intensity received by the sensor versus position of column of pixels. The intensity versus position includes a perturbation caused by the Y-bar. Analyzing includes finding the center of the perturbation to find the center of the Y-bar.

In another implementation the controller is configured to: (a) operate the second projection module to project a second sequence of columns of pixels onto the target; the second sequence of columns of pixels are individually approximately angularly aligned with the Y-axis; the second temporal sequence of columns are separated from each other along the X-axis; (b) operate the radiation sensor to measure an intensity of light from the target during the second sequence; (c) store second information indicative of the measured intensity versus column axial position; (d) analyze the stored second information to align the second projection module to the calibration target along the X-axis. The first sequence of columns of pixels are aligned to a first Y-bar within the first image field and outside of the second image field. The second sequence of pixels are aligned to a second Y-bar that is located within the second image field and outside of the first image field.

In yet another implementation the controller is configured to: (a) operate the second projection module to project a second sequence of columns of pixels onto the target; the second sequence of columns of pixels are individually approximately angularly aligned with the Y-axis; the second temporal sequence of columns are separated from each other along the X-axis; (b) operate the radiation sensor to measure an intensity of light from the target during the second sequence; (c) store second information indicative of the measured intensity versus column axial position; (d) analyze the stored second information to align the second projection module to the calibration target along the X-axis. The first and second sequence of pixels are aligned to the same Y-bar within an overlap field between the first image field and the second image field.

In a further implementation the controller is configured to: (a) operate the first projection module to generate a third sequence of rows of pixels onto the target, the rows are individually approximately angularly aligned with the X-axis; the third sequence of rows are displaced from each other along the Y-axis; (b) operate the radiation sensor to measure an intensity of light from the target during the third sequence; (c) store third information indicative of the measured intensity versus column position; (d) analyze the stored third information to align the first projection module to the calibration target along the Y-axis.

In a yet further implementation the controller is configured to: (a) operate the first projection module to generate a plurality of sequences of columns of pixels onto the target having a varying theta-Z orientation with respect to a vertical Z-axis; each column within a sequence of columns being displaced from each other along the X-axis; (b) operate the radiation sensor to measure an intensity of light from the target during the plurality of sequences; (c) store fourth information indicative of the measured intensity versus column position for a plurality of intensity versus position curves that each correspond to one of the sequences; (d) analyze the fourth information to angularly align the first projection module to the calibration target with respect to theta-Z. The analyzing can include selecting an orientation corresponding to one or more of: (1) a maximized slope of intensity versus position for a transition at the edge of a Y-bar, (2) minimize a width of a perturbation from a field intensity, and (3) maximize a width of an intensity extremum corresponding to complete overlap between a pixel column and a Y-bar.

DETAILED DESCRIPTION OF THE PREFERRED EMBODIMENTS

FIG. 1 is a schematic diagram of a three-dimensional printing system 2. In describing the three dimensional printing system 2, mutually perpendicular axes X, Y and Z will be used. Axes X and Y are lateral axes. In some embodiments X and Y are also horizontal axes. In some embodiments Z is a vertical axis. In some embodiments the direction +Z is generally upward and the direction −Z is generally downward. In addition, a rotational coordinate theta-Z or $\theta_z$, will be used. Theta-Z refers to rotation about the vertical Z-axis.

System 2 includes a support plate 4 for supporting a resin vessel 6 above a light engine 8 during manufacture or fabrication of a three-dimensional article. The resin vessel 6 is for containing a photocurable resin 10. The photocurable resin 10 is selectively cured by the light engine 8 in a layer-by-layer manner during manufacture of the three-dimensional article. The selective curing occurs across a lateral build field 20 that is at a certain height above the light engine 8.

In the illustrated embodiment a transparent substrate 12 is shown installed upon the support plate 4. The transparent substrate 12 has an upper surface 14 that supports a target 16. The target 16 defines a pattern 18 that is used for aligning portions of light engine 8. In some embodiments, the target 16 can be formed directly onto the substrate 12. In an illustrative embodiment, the target 16 is a material sheet with a printed pattern 18. The printed pattern 18 is positioned at the build field 20.

The light engine 8 includes two or more projection modules 9 including at least a first projection module 9A and a second projection module 9B. The first projection module 9A and the second projection module 9B separately image different portions of the build field 20 but they also image an overlapping portion as will be discussed in more detail with respect to FIG. 2.

A radiation sensor 22 is positioned either above or below the build field 20. Sensor 22 is configured to sense radiation that is either transmitted by, re-emitted by, or reflected by the target 16.

A controller 24 is coupled to the light engine 8 and the sensor 22. The controller 24 includes a processor 26 coupled to an information storage device 28. The information storage device 28 includes a non-transitory computer readable storage medium that stores software instructions. In response to execution by the processor, the software instructions operate and monitor the light engine 8, the sensor 22, and other portions of system 2.

Figure 2:
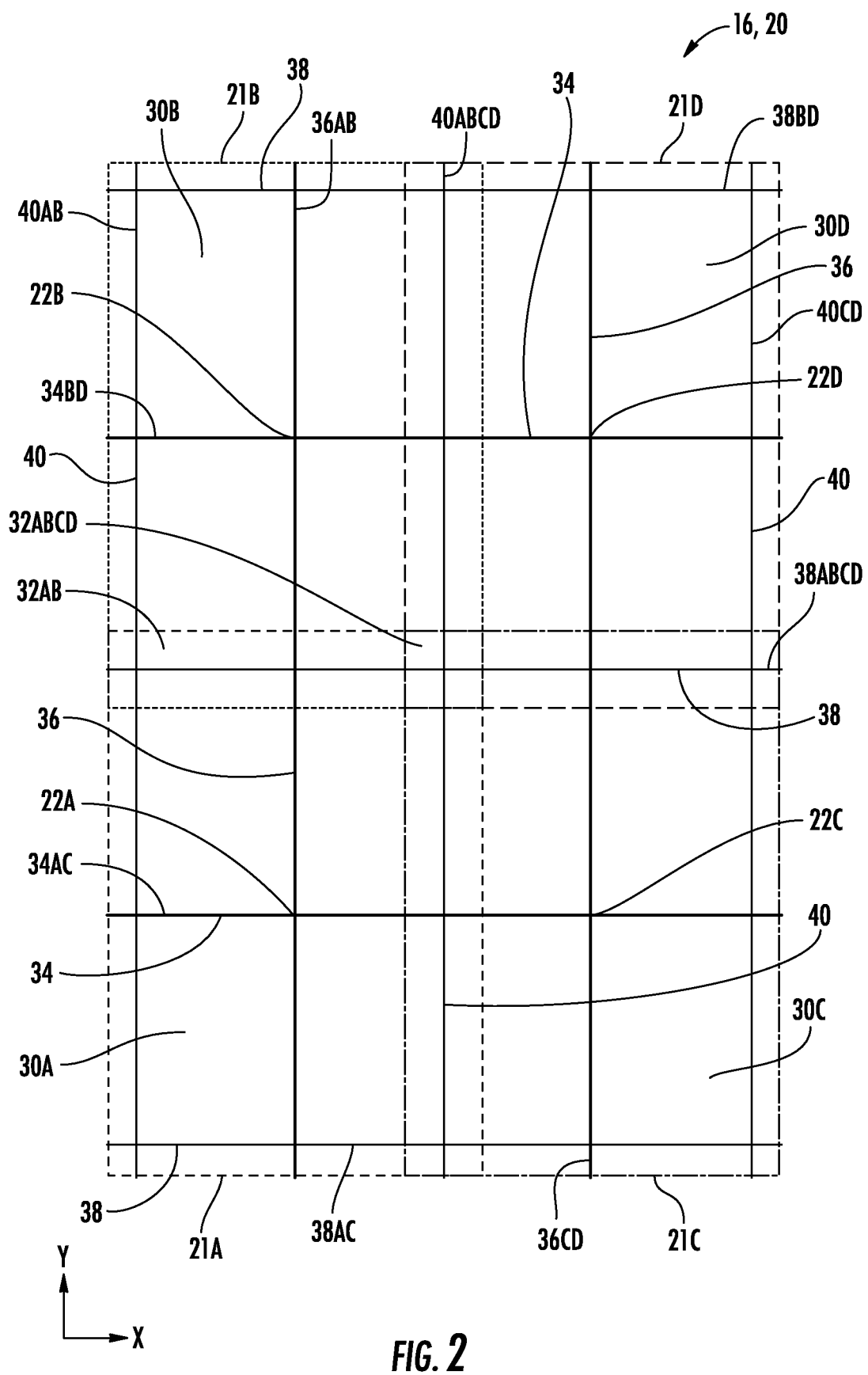
FIG. 2 is a schematic diagram depicting an embodiment of a target overlaying a build field.

FIG. 2 is a diagram depicting an embodiment of the target 16 and the build field 20 superposed. The embodiment of FIG. 2 is a result of a system 2 having four projection modules 9A-D. The build field 20 is a composite of four image fields 21A, 21B, 21C, and 21D that correspond to the projection modules 9A-D.

The image fields 21 individually include a non-overlapping zone 30 that is imaged by a single projection module 9. For example, non-overlapping zone 30A of image field 21A is imaged by only the projection module 9A. The build field 20 also has overlap zones 32 within which two or more image fields 21 overlap. For example, overlap zone 32AB is a rectangular zone over which image fields 21A and 21B overlap. The overlap zone 32ABCD is a rectangular zone over which all four image fields 21A-D overlap.

In an illustrative embodiment, the target 16 includes a sheet of material that either reflects, transmits, and/or fluoresces in response to radiation from the light engine 8. The target includes a plurality of elongate printed light modulating lines or bars of varying width including X-bars (34, 38) and Y-bars (36, 40) which are further referred to as wide X-bars 34, wide Y-bars 36, narrow X-bars 38, and narrow Y-bars 40. In FIG. 2, element numbers also include letter indicia to indicate which image fields 21 are overlaid. For example, the wide X-bar 34AC passes through the image fields 21A and 21C. Narrow Y-bar bar 40CD passes through image fields 21C and 21D. Narrow X-bar bar 38ABCD passes through all four image fields 21A-D.

In the illustrative embodiment there can be four sensors 22A-D corresponding to the four image fields 21A-D. The four sensors 22A-D can be individually positioned directly above or below an approximate center of the corresponding image field 21A-D which is approximately where a wide X-bar 34 crosses a wide Y-bar 36. For example, sensor 22A is placed above or below the intersection of the X-bar 34AC and the Y-bar 36AB.

The controller 24 is configured to operate the projection modules 9, capture information from sensors 22, and to analyze the information to align the image fields 21 of the projection modules 9 relative to the target 16 and to each other. In doing so, the wide X-bars 34 are used to individually align the projection modules 9 to the target 16 along the Y-axis. The wide Y-bars 36 are used to individually align the projection modules 9 to the target along the X-axis. Inner narrow X-bar 38ABCD and Y-bar 40ABCD can be used to fine tune alignment of the projectors with respect to each other. Outer narrow X-bars 38 and Y-bars 40 can be used to compensate for distortion such as barrel distortion and keystone distortion.

Figure 3:
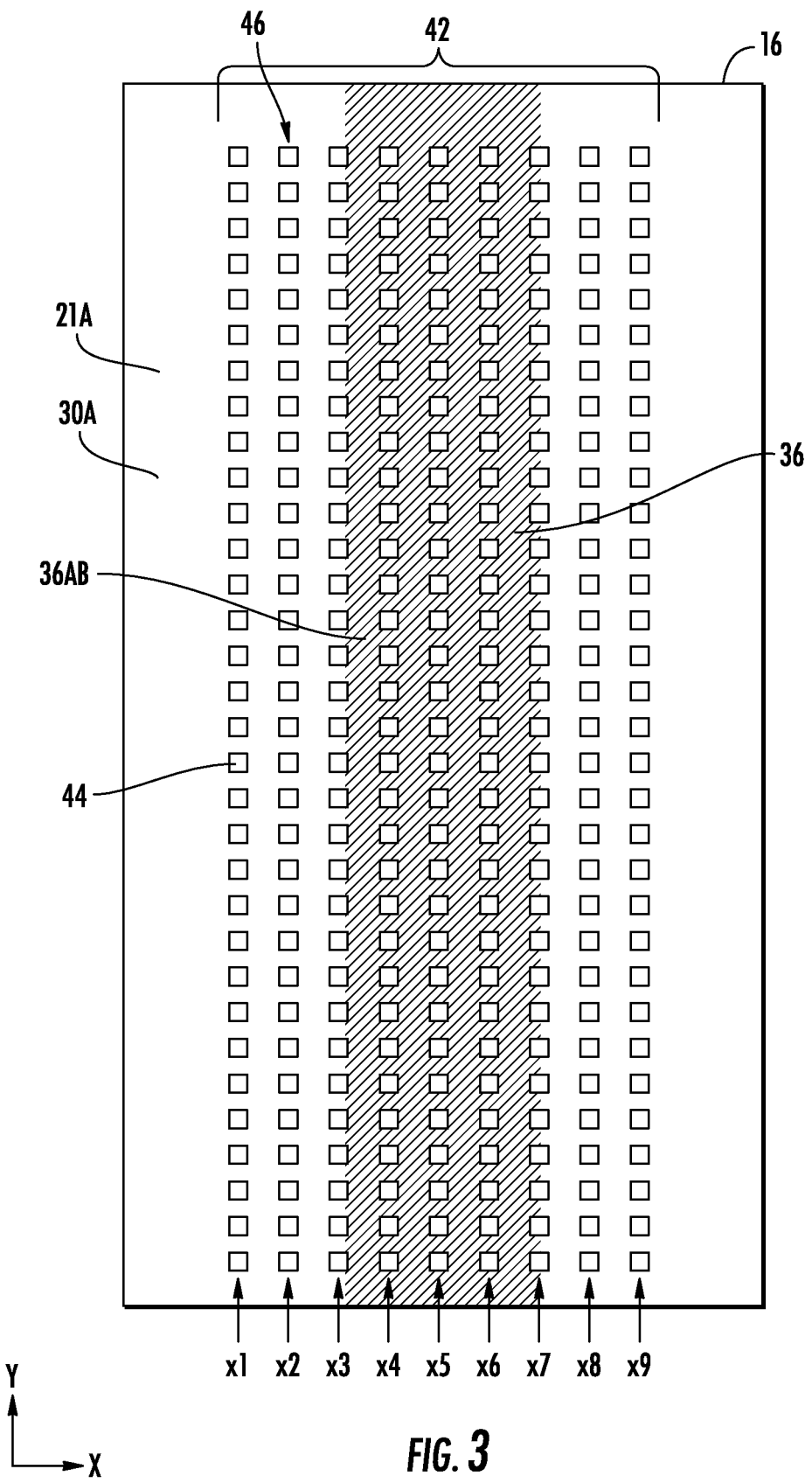
FIG. 3 is a diagram of a spatial sequence of pixel columns that are projected onto a portion of a target.

FIG. 3 is a diagram superposing a spatial sequence 42 of pixel 44 columns 46 onto a portion of the target 16 which is superposed with a non-overlapping portion 30A of image field 21A. Target 16 includes a portion of wide Y-bar 36AB. The columns of pixels are generated at different times so that useful sensor data can be captured.

The arrows labeled x1, x2, and so on indicate pixel columns 46 that are projected onto the target 16 at different axial locations (generally along the X-axis) by the projection module 9A. At axial location x1, the column above the arrow x1 is projected. At axial location x2, the column above the arrow x2 is projected. The axial location indicators x1, x2, x3, etc., also correspond to different times. In other words, at a particular time, a single one of the columns are projected to avoid confounding a signal captured by sensor 22A. The columns 46 can be projected in any temporal order.

When a pixel column 46 is projected onto the light (white) area of the target, a relatively maximum intensity of radiation is received by the sensor 22A because the radiation is either reflected, re-emitted (as a longer wavelength), or transmitted to the sensor 22A. Thus, the pixel column 46 displayed at X-axis locations x1, x2, x8, and x9 will tend to result in a maximum radiation signal for the sensor 22A.

On the other hand, when a pixel column is projected fully onto the dark area (Y-bar 36AB) of the target, a relatively minimum intensity of radiation is received by sensor 22A. Thus, the pixel columns 46 displayed at X coordinates x4, x5, and x6 will tend to result in a minimum radiation signal.

The pixel columns 46 for x3 and x7 partially overlap the Y-bar 36AB and so an intermediate intensity of radiation is received by sensor 22A. Thus, the pixel columns 46 displayed at x3 and x7 will tend to result in an intermediate radiation signal.

Figure 4:
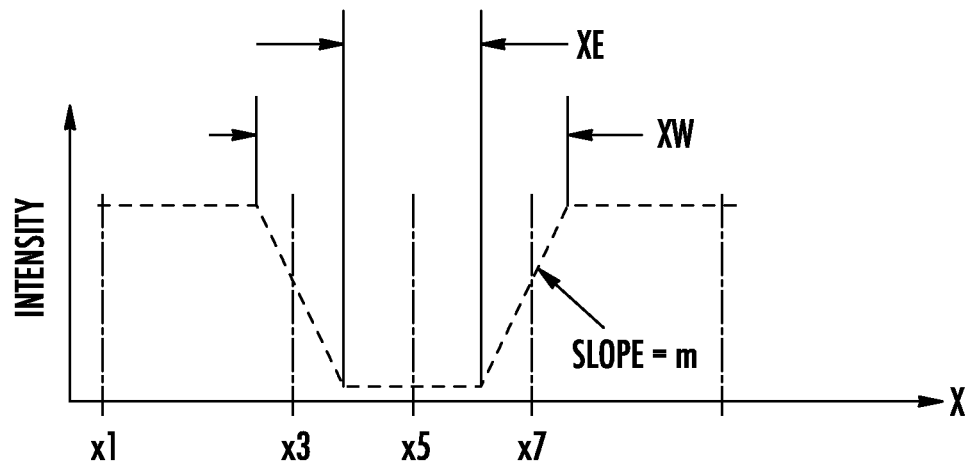
FIG. 4 is a graph of sensed intensity versus pixel column location.

FIG. 4 is an approximate graph of intensity received by sensor 22A versus position x which corresponds to FIG. 3. Some of the x-values including x1, x3, and x5 from FIG. 3 are indicated. As shown, the intensity is maximized whenever the pixel column 46 is away from a Y-bar 36 as at value x1. When the pixel column 46 partially overlaps the Y-bar, the intensity is at an intermediate level as at x3. When the pixel column 46 is fully within the Y-bar 36, the intensity is minimized as at x5.

Various metrics can be computed using the data from the graph of FIG. 4. A time XE (width of extremum) is a width of the graph at which the intensity is at minimum. A width XW is a width of the overall perturbation caused by the Y-bar 36. Yet another metric would be a magnitude of a slope (m) of the graph at time x3 and/or time x7 in a transition between a high intensity and a low intensity signal. A further metric would be a ratio of XE to XW.

Figure 5:
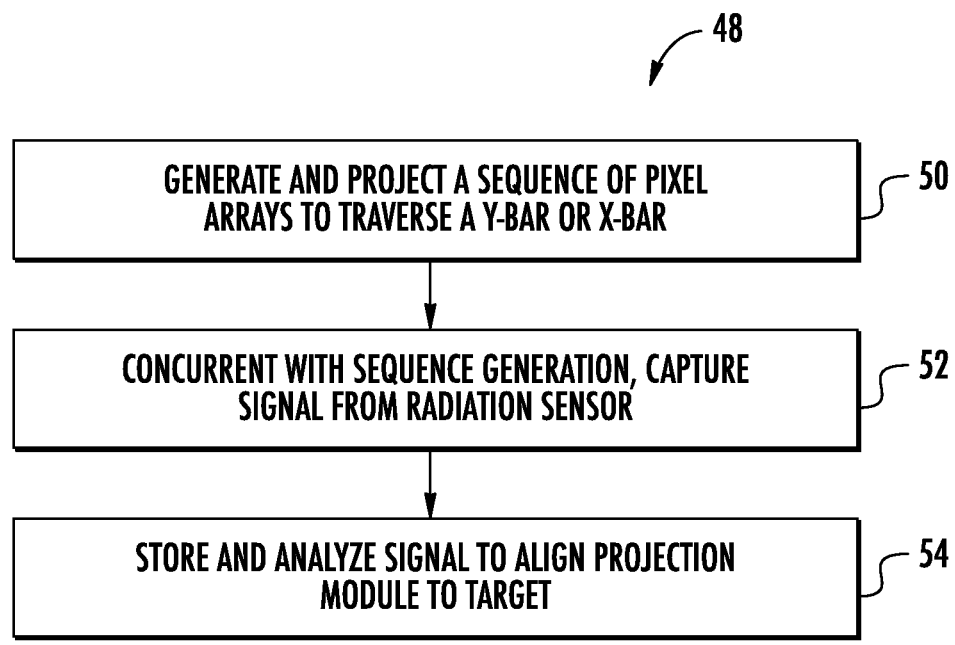
FIG. 5 is a flowchart of an embodiment of a method of aligning a projection module to a target along one axis.

FIG. 5 is a flowchart of a method of aligning a projection module 9 to the target 16. According to 50, a sequence of pixel arrays is generated and projected onto the target 16. Each of the sequence of pixel arrays is displayed at a different axial location. FIG. 3 previously illustrated the pixel arrays as pixel columns 46 displayed at axial locations x1, x2, and so on.

According to 52, concurrent with the sequence generation, a sensor 22 receives the radiation and outputs a signal to the controller 24. According to 54, the signal is analyzed to align the projection module 9 to the target 16.

In one embodiment of FIG. 4 a center of the perturbation (deflection from maximum intensity) is computed to be a center of the Y-bar along the X-axis. This center can be aligned to a corresponding pixel column 46 or an interpolation between two pixel columns 46.

Figure 6:
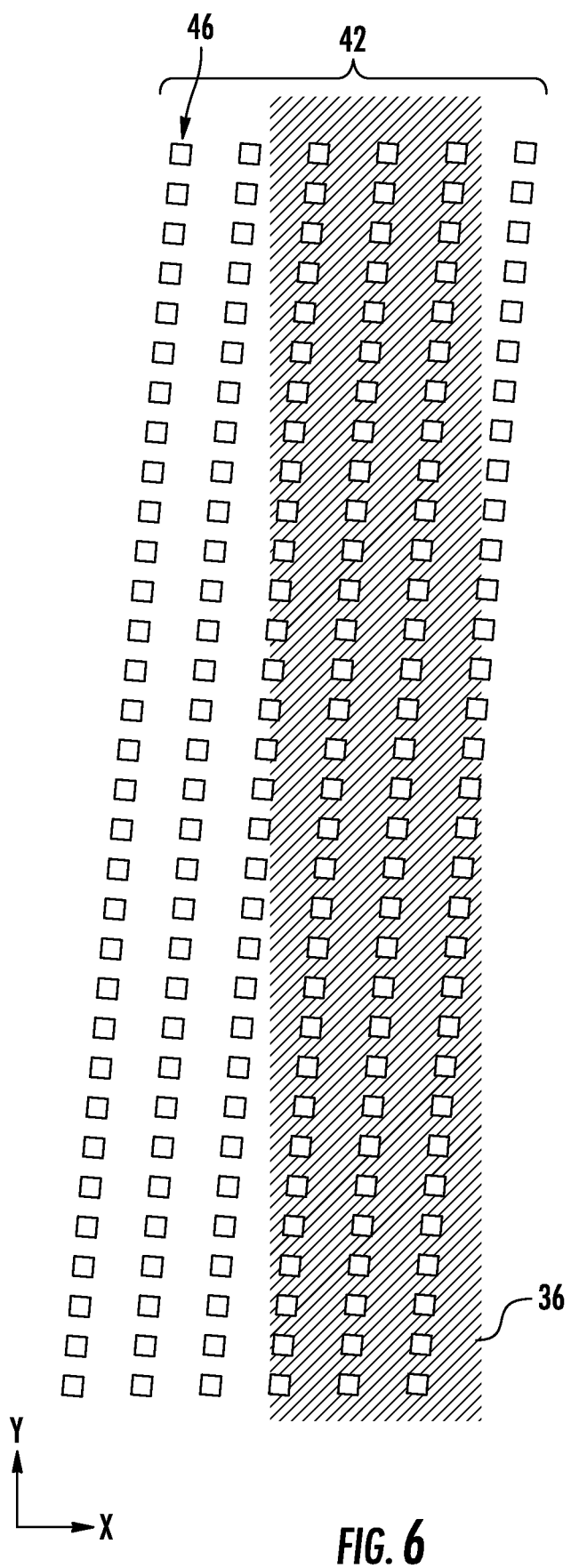
FIG. 6 is a diagram of a spatial sequence of pixel columns that are projected onto a portion of a target. The spatial sequence of pixel columns have an exaggerated theta-z angular alignment error with respect to the target.

FIG. 3 depicts the pixel column 46 as being very nearly parallel to the Y-bar 36. However, the Y-bar may not be perfectly parallel. FIG. 6 depicts a situation in which the pixel row 46 is angularly misaligned about the Z-axis (in Theta-Z) relative to the Y-bar 36. The angular skew of FIG. 6 is exaggerated for illustrative purposes to facilitate explanation.

Figure 7A:
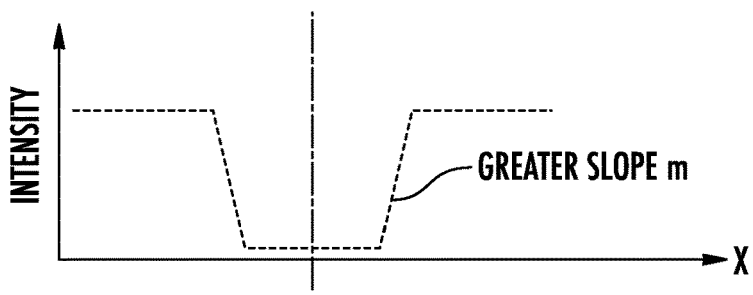
FIG. 7A is a graph of sensed intensity versus pixel array location in which the pixel columns have a relatively small theta-z angular alignment error with respect to the target.
Figure 7B:
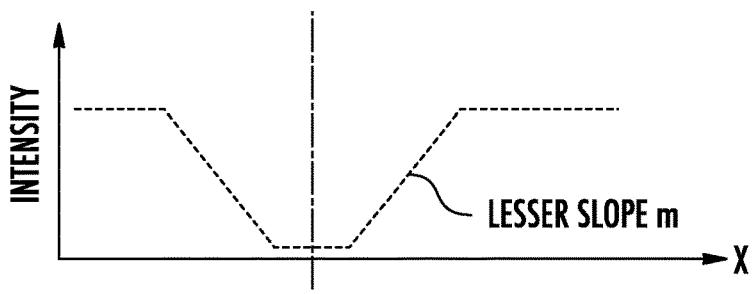
FIG. 7B is a graph of sensed intensity versus pixel array location in which the pixel columns have a relatively large theta-z angular alignment error with respect to the target.

FIGS. 7A and 7B show the comparison of intensity versus X sequences (like FIG. 4) that are obtained when the angular misalignment is relatively small (FIG. 7A) and large (FIG. 7B). Therefore, FIG. 7A corresponds to the pixel column sequence of FIG. 3 and FIG. 7B corresponds to the pixel column sequence of FIG. 6. As the angular alignment improves, several changes occur. First, the slope m of the graph between minimum intensity and maximum intensity increases. At the same time, the width XW (see FIG. 4) decreases. Third, the width XE increases. Fourth, a ratio of XE to XW converges on unity.

Figure 8:
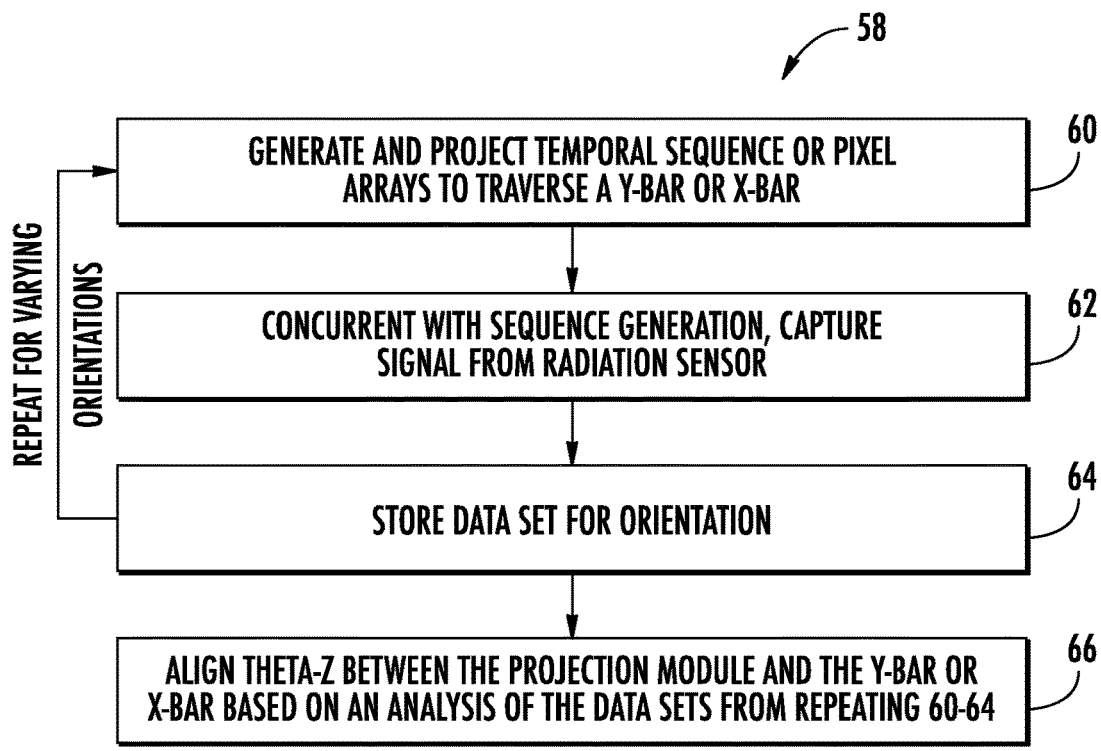
FIG. 8 is a flowchart depicting an embodiment of a method of angularly aligning a projection module to a target with respect to theta-Z.

FIG. 8 is a flowchart depicting a method 58 of angularly aligning a projection module 9 to a target 16. According to 60, a sequence of pixel arrays is generated and projected onto the target 16. According to 62, concurrent with the sequence generation, a sensor 22 receives the radiation and outputs a signal to the controller 24. According to 64, a data set characterizing the signal is stored. The data set can define a graph such as that depicted in FIG. 4. Steps 60-64 are repeated for varying orientations of the pixel arrays and the characterizing data stored.

According to 66, the data sets are analyzed to align the projection module 9 to the target 16. This can be done by analyzing metrics such as the slope m, width XE, or width XW. The angular orientation of a pixel array for which slope m is maximized, XE is maximized, and/or XW is minimized would be the closest angular alignment to the Y-bar 36.

Figure 9:
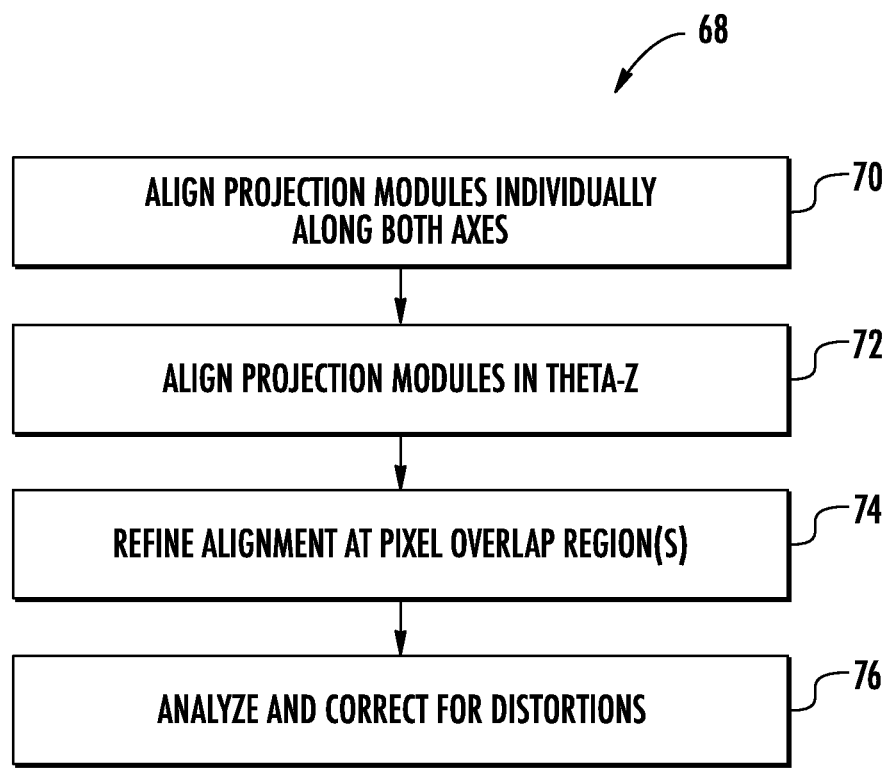
FIG. 9 is a flowchart depicting an embodiment of an overall process sequence for aligning a plurality of projection modules of a three-dimensional printing system.

FIG. 9 is a flowchart depicting an overall process sequence 68 for aligning the projection modules 9 of a three-dimensional printing system 2. According to 70, the individual projection modules are aligned in X and Y to the target 16. For a single projection module, this includes performing the method 48 twice—once aligning to the Y-bar and then aligning to the X-bar.

According to 72, the projection modules 9 are individually aligned to the target 16 in theta-Z. This can include performing method 58 for each projection module 9.

According to 74, the alignment can be performed in the overlapping regions 32 using thin X-bar 38 and thin Y-bar 40. The method of step 74 is essentially the same as method 48, and serves to refine alignment accuracy between the projection modules 9.

According to FIG. 76, further processes can be performed using the outer thin X-bars 38 and thin Y-bars 40 to provide data to correct for distortions such as barrel distortions and keystone errors. Generating data sets for such corrections can employ methods similar or related to those discussed with respect to FIGS. 3-8.

Methods have been described with respect to FIGS. 2-9 using a light field target (white or clear target with dark bars). However, very similar methods can be performed using dark field targets in which the indicia are clear or white and the field is dark or black.

Although the above disclosure has been described in terms of aligning plural projectors, some of the apparatus and techniques above may be applicable to correcting distortions for a system having a single projector. The specific embodiments and applications thereof described above are for illustrative purposes only and do not preclude modifications and variations encompassed by the scope of the following claims.

What is claimed:

1. A three-dimensional printing system for fabricating a three-dimensional article comprising:
   a substrate having a surface positioned proximate to a build field, the build field for hardening layers of a build material, the surface supporting a calibration target, the calibration target including elongate light modulating bars that are disposed at two different orientations including a Y-bar aligned with a Y-axis and an X-bar aligned with an X-axis;
   a light engine that includes a plurality of projection modules including at least a first projection module and a second projection module, the first projection module configured to project an array of pixels onto a first image field, the second projection module configured to project an array of pixels onto a second image field, the image fields of the light engine covering the build field and including at least one overlap field;
   a radiation sensor that receives light from the calibration target; and
   a controller configured to:
      operate the first projection module to project a first sequence of columns of pixels onto the target, the columns are individually approximately angularly aligned with the Y-axis, the first sequence of columns are separated from each other along the X-axis;
      operate the radiation sensor to measure an intensity of light from the target during the first sequence;
      store first information indicative of the measured intensity versus column axial position; and
      analyze the stored first information to align the first projection module to the calibration target along the X-axis.

2. The three-dimensional printing system of claim 1 wherein the stored first information defines an intensity received by the sensor versus position of column of pixels, the intensity versus position includes a perturbation caused by the Y-bar, analyzing includes finding the center of the perturbation to find the center of the Y-bar.

3. The three-dimensional printing system of claim 1 wherein the controller is configured to:
   operate the second projection module to project a second sequence of columns of pixels onto the target, the second sequence of columns of pixels are individually approximately angularly aligned with the Y-axis, the second sequence of columns are separated from each other along the X-axis;
   operate the radiation sensor to measure an intensity of light from the target during the second sequence;
   store second information indicative of the measured intensity versus column axial position; and
   analyze the stored second information to align the second projection module to the calibration target along the X-axis.

4. The three-dimensional printing system of claim 3 wherein the first sequence of columns of pixels are aligned to a first Y-bar within the first image field and outside of the second image field, the second sequence of pixels are aligned to a second Y-bar that is located within the second image field and outside of the first image field.

5. The three-dimensional printing system of claim 3 wherein the first and second sequence of pixels are aligned to the same Y-bar within an overlap field between the first image field and the second image field.

6. The three-dimensional printing system of claim 1 wherein the controller is configured to:
   operate the first projection module to generate a third sequence of rows of pixels onto the target, the rows are individually approximately angularly aligned with the X-axis, the third sequence of rows are displaced from each other along the Y-axis;
   operate the radiation sensor to measure an intensity of light from the target during the third sequence;
   store third information indicative of the measured intensity versus column position; and
   analyze the stored third information to align the first projection module to the calibration target along the Y-axis.

7. The three-dimensional printing system of claim 1 wherein the controller is configured to:
   operate the first projection module to generate a plurality of sequences of columns of pixels onto the target having a varying theta-Z orientation with respect to a vertical Z-axis, each column within a sequence of columns being displaced from each other along the X-axis;
   operate the radiation sensor to measure an intensity of light from the target during the plurality of sequences;
   store fourth information indicative of the measured intensity versus column position for a plurality of intensity versus position curves that each correspond to one of the sequences; and
   analyze the stored fourth information to angularly align the first projection module to the calibration target with respect to theta-Z.

8. The three-dimensional printing system of claim 7 wherein analyzing includes selecting an orientation corresponding to one or more of: (1) a maximized slope of intensity versus position for a transition at the edge of a Y-bar, (2) minimize a width of a perturbation from a field intensity, and (3) maximize a width of an intensity extremum corresponding to complete overlap between a pixel column and a Y-bar.

9. The three-dimensional printing system of claim 1 wherein the target is a light field target and the modulating bars have an increased absorption of the radiation relative to the light field.

10. The three-dimensional printing system of claim 1 further comprising a resin vessel for containing photocurable resin to be selectively cured by the light engine and a support plate for alternately supporting the resin vessel and the substrate.

11. A method of operating a three-dimensional printing system for manufacturing a three-dimensional article comprising:

positioning a substrate surface proximate to a build field, the build field for hardening layers of a build material, the surface supporting a calibration target, the calibration target including elongate light modulating bars that are disposed at two different orientations including a Y-bar aligned with a Y-axis and an X-bar aligned with an X-axis;

operating a light engine that includes a plurality of projection modules including at least a first projection module and a second projection module, the first projection module configured to project an array of pixels onto a first image field, the second projection module configured to project an array of pixels onto a second image field, the image fields of the light engine covering the build field and including at least one overlap field, operating the light engine includes operating the first projection module to generate a first sequence of columns of pixels onto the target, the columns are individually approximately angularly aligned with the Y-axis, the first sequence of columns are displaced from each other along the X-axis;

operating a radiation sensor to measure an intensity of light from the target during the first sequence;

storing first information indicative of the measured intensity versus a column position from the radiation sensor; and analyzing the stored first information to align the first projection module to the calibration target along the X-axis.

12. The method of claim 11 wherein the stored first information defines an intensity received by the sensor versus position of column of pixels, the intensity versus position includes a perturbation caused by the Y-bar, analyzing includes finding the center of the perturbation to find the center of the Y-bar.

13. The method of claim 11 further comprising:
operating the second projection module to project a second sequence of columns of pixels onto the target, the second sequence of columns of pixels are individually approximately angularly aligned with the Y-axis, the second sequence of columns are separated from each other along the X-axis;
operating the radiation sensor to measure an intensity of light from the target during the second sequence;
storing second information indicative of the measured intensity versus column axial position; and
analyzing the stored second information to align the second projection module to the calibration target along the X-axis.

14. The method of claim 13 wherein the first sequence of columns of pixels are aligned to a first Y-bar within the first image field and outside of the second image field, the second sequence of pixels are aligned to a second Y-bar that is located within the second image field and outside of the first image field.

15. The method of claim 13 the first and second sequence of pixels are aligned to the same Y-bar within an overlap field between the first image field and the second image field.

16. The method of claim 11 further comprising:
operating the first projection module to generate a third sequence of rows of pixels onto the target, the rows are individually approximately angularly aligned with the X-axis, the third sequence of rows are displaced from each other along the Y-axis;
operating the radiation sensor to measure an intensity of light from the target during the third sequence;
storing third information indicative of the measured intensity versus column position; and
analyzing the stored third information to align the first projection module to the calibration target along the Y-axis.

17. The method of claim 11 further comprising:
operating the first projection module to generate a plurality of sequences of columns of pixels onto the target having a varying theta-Z orientation with respect to a vertical Z-axis, each column within a sequence of columns being displaced from each other along the X-axis;
operating the radiation sensor to measure an intensity of light from the target during the plurality of sequences;
storing fourth information indicative of the measured intensity versus column position for a plurality of intensity versus position curves that each correspond to one of the sequences; and
analyzing the stored fourth information to angularly align the first projection module to the calibration target with respect to theta-Z.

18. The method of claim 17 wherein analyzing includes selecting an orientation corresponding to one or more of: (1) a maximized slope of intensity versus position for a transition at the edge of a Y-bar, (2) minimize a width of a perturbation from a field intensity, and (3) maximize a width of an intensity extremum corresponding to complete overlap between a pixel column and a Y-bar.

19. The method of claim 11 further comprising:
performing additional calibration operations with the substrate surface positioned;
removing the substrate from the three-dimensional printing system;
positioning a resin vessel into the three-dimensional printing system; and
operating the three-dimensional printing system to manufacture the three-dimensional article.

* * * * *